US012200699B2

(12) United States Patent
He et al.

(10) Patent No.: US 12,200,699 B2
(45) Date of Patent: Jan. 14, 2025

(54) PHYSICAL DOWNLINK CONTROL CHANNEL CANDIDATE RESOURCE MAPPING AND TRANSMISSION FOR MULTI-TRP OPERATION

(71) Applicant: Apple Inc., Cupertino, CA (US)

(72) Inventors: Hong He, San Jose, CA (US); Chunhai Yao, Beijing (CN); Chunxuan Ye, San Diego, CA (US); Dawei Zhang, Saratoga, CA (US); Haitong Sun, Cupertino, CA (US); Huaning Niu, San Jose, CA (US); Oghenekome Oteri, San Diego, CA (US); Seyed Ali Akbar Fakoorian, San Diego, CA (US); Sigen Ye, Whitehouse Station, NJ (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 430 days.

(21) Appl. No.: 17/593,232

(22) PCT Filed: Oct. 14, 2020

(86) PCT No.: PCT/CN2020/120966
§ 371 (c)(1),
(2) Date: Sep. 13, 2021

(87) PCT Pub. No.: WO2022/077291
PCT Pub. Date: Apr. 21, 2022

(65) Prior Publication Data

US 2022/0312448 A1 Sep. 29, 2022

(51) Int. Cl.
*H04W 72/12* (2023.01)
*H04L 1/00* (2006.01)
(Continued)

(52) U.S. Cl.
CPC ....... *H04W 72/1273* (2013.01); *H04L 1/0071* (2013.01); *H04W 72/0453* (2013.01); *H04W 72/23* (2023.01); *H04W 72/232* (2023.01)

(58) Field of Classification Search
CPC ............... H04W 72/23; H04W 72/232; H04W 72/1273; H04W 1/0071; H04W 72/0453;
(Continued)

(56) References Cited

U.S. PATENT DOCUMENTS 11,096,170 B2 * 8/2021 Sun .................. H04W 72/0453
2018/0359755 A1 * 12/2018 Sun ...................... H04L 5/0053
(Continued)

FOREIGN PATENT DOCUMENTS

| | | |
|---|---|---|
| CN | 111436233 A | 7/2020 |
| WO | 2020/069415 | 4/2020 |
| WO | 2020/122685 A1 | 6/2020 |

OTHER PUBLICATIONS

Huawei et al., "Summary of AI: 7.2.8.2 Enhancements on Multi-TRP/Panel Transmission of Offline Discussion", 3GPP TSG RAN WAG1 #96, R1-190abcd, Mar. 1, 2019, 59 sheets.
(Continued)

*Primary Examiner* — Jay P Patel
(74) *Attorney, Agent, or Firm* — Fay Kaplun & Marcin, LLP

(57) ABSTRACT

A base station maps physical downlink control channel (PDCCH) candidates and PDCCH transmissions for multi-transmission reception point (TRP) operation. The base station determines that a control resource set (CORESET) is to be shared by at least a first TRP and a second TRP corresponding to a cell of a network, performs resource element group (REG) bundle to virtual REG bundle mapping on a per TRP basis, wherein multiple REG bundles are indexed on the per TRP basis, performs virtual REG bundle
(Continued)

interleaving across the first TRP and the second TRP, performs control channel element (CCE) to interleaved REG bundle mapping and transmits downlink control information (DCI) using the CORESET, wherein the CORESET is configured based on, at least, the CCE to interleaved REG bundle mapping.

15 Claims, 8 Drawing Sheets

(51) Int. Cl.

| | |
|---|---|
| ***H04W 72/0453*** | (2023.01) |
| ***H04W 72/1273*** | (2023.01) |
| ***H04W 72/23*** | (2023.01) |
| ***H04W 72/232*** | (2023.01) |

(58) Field of Classification Search

CPC .. H04W 5/0048; H04L 5/0053; H04L 5/0094; H04L 5/0091; H04L 5/0035

See application file for complete search history.

(56) References Cited

U.S. PATENT DOCUMENTS

2019/0089486 A1* 3/2019 Kim ...................... H04L 1/0041
2020/0045569 A1* 2/2020 Seo ....................... H04W 72/56
2020/0068492 A1* 2/2020 Lee ................... H04W 52/0261
2020/0153581 A1 5/2020 Tsai et al.
2020/0187171 A1* 6/2020 Hwang ................. H04W 72/23
2020/0412515 A1* 12/2020 Xu ........................ H04W 24/08
2022/0095342 A1* 3/2022 Khoshnevisan ...... H04L 5/0094
2023/0087095 A1* 3/2023 Ma ........................ H04L 5/0053
370/329
2023/0336311 A1* 10/2023 Li ......................... H04L 5/0053

OTHER PUBLICATIONS

Ericsson, "On PDCCH, PUCCH and PUSCH Robustness", 3GPP TSG-RAN WG1 #102, R1-2006367, Aug. 28, 2020, 12 sheets.

Ericsson, "On NR-PDCCH Structure", 3GPP TSG RAN WG1 #3, R1-1716577, Sep. 21, 2017, 11 sheets.

ETRI, "On REG Interleaving for Distributed NR-PDCCH", 3GPP TSG, RAN WG1 #89, R1-1708098, May 19, 2017, 5 sheets.

Qualcomm Incorporated, "Discussion Summary for mTRP PDCCH Reliability Enhancements", 3GPP TSG RAN WG1 #102-e, R1-200xxx, Aug. 28, 2020, 42 sheets.

Vivo, "Discussion on enhancement on PDCCH, PUCCH, PUSCH in MTRP scenario", 3GPP TSG RAN WG1, R1-2005364, Aug. 8, 2020, 12 sheets.

ZTE et al., Consideration on Enhancement of TCI-State MAC CE for Muliti-TRP transmission, 3GPP TSG RAN WG2, R2-1913049, Oct. 4, 2019, 7 sheets.

* cited by examiner

PHYSICAL DOWNLINK CONTROL CHANNEL CANDIDATE RESOURCE MAPPING AND TRANSMISSION FOR MULTI-TRP OPERATION

BACKGROUND

A cell of the network may be configured with multiple transmission reception points (TRPs). In a multi-TRP deployment scenario, a physical downlink control channel (PDCCH) may have downlink control information (DCI) repetition over different TRPs. For example, one control resource set (CORESET) may be shared by two TRPs. However, to adequately implement this type of functionality, there exists a need for mechanisms configured to perform PDCCH candidate mapping and PDCCH transmission for multi-TRP operation.

SUMMARY

Some exemplary embodiments are related to a processor configured to perform operations. The operations include determining that a control resource set (CORESET) is to be shared by at least a first transmission reception point (TRP) and a second TRP corresponding to a cell of a network, performing resource element group (REG) bundle to virtual REG bundle mapping on a per TRP basis, wherein multiple REG bundles are indexed on the per TRP basis, performing virtual REG bundle interleaving across the first TRP and the second TRP, performing control channel element (CCE) to interleaved REG bundle mapping and transmitting downlink control information (DCI) using the CORESET, wherein the CORESET is configured based on, at least, the CCE to interleaved REG bundle mapping.

Other exemplary embodiments are related to a processor configured to perform operations. The operations include monitoring a physical downlink control channel (PDCCH) for downlink control information (DCI) transmitted by a cell of a network, receiving the DCI carried by the PDCCH from the cell of the network and performing an operation in response to the DCI.

Still further exemplary embodiments are related to a cell including a communications interface configured to communicate with a user equipment (UE) and a processor communicatively coupled to the communications interface and configured to perform operations. The operations include determining that a control resource set (CORESET) is to be shared by at least a first transmission reception point (TRP) and a second TRP of the cell, performing resource element group (REG) bundle to virtual REG bundle mapping on a per TRP basis, wherein multiple REG bundles are indexed on the per TRP basis, performing virtual REG bundle interleaving across the first TRP and the second TRP, performing control channel element (CCE) to interleaved REG bundle mapping and transmitting downlink control information (DCI) using the CORESET, wherein the CORESET is configured based on, at least, the CCE to interleaved REG bundle mapping.

DETAILED DESCRIPTION

Figure 1:
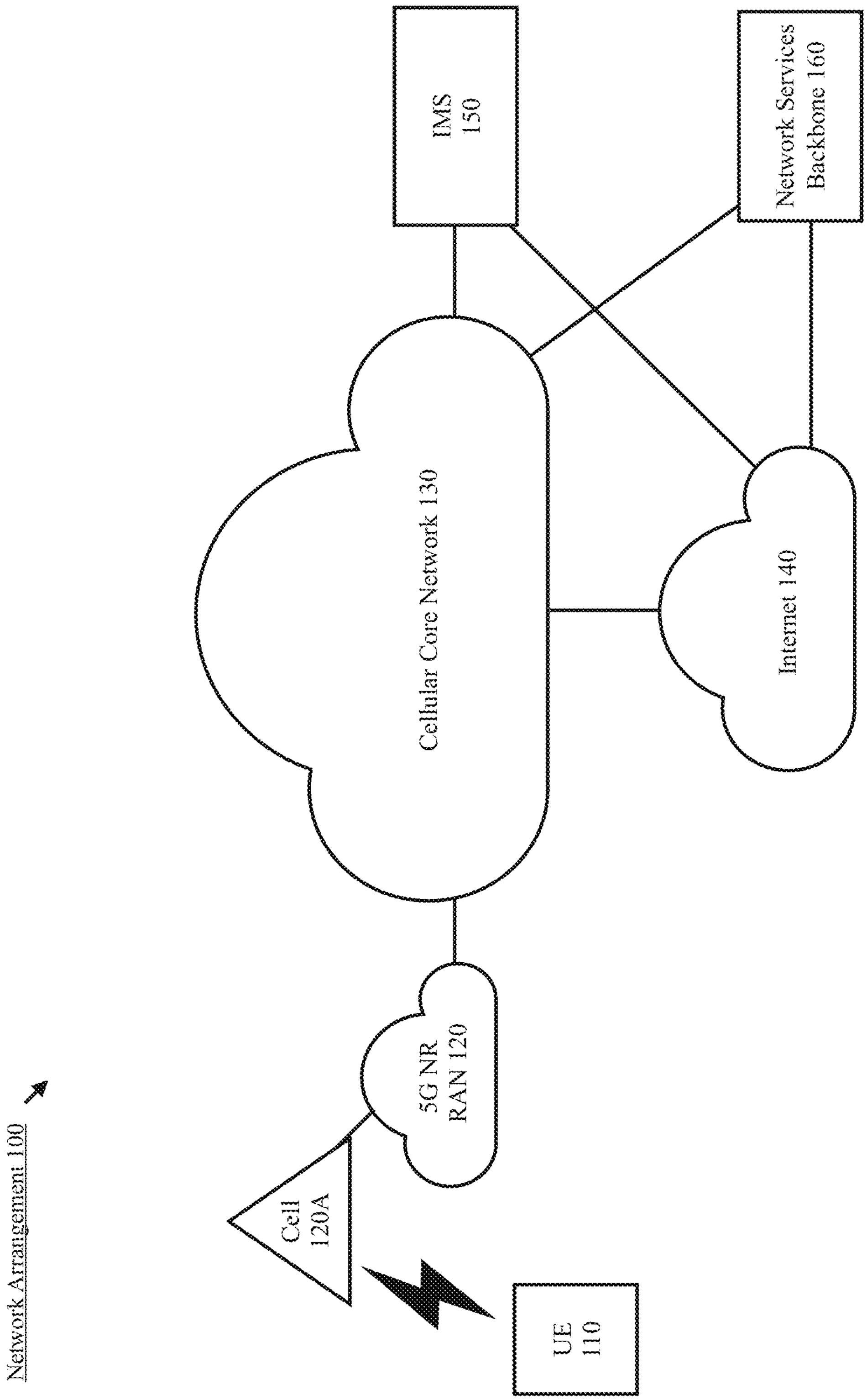
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to multi-transmission reception point (TRP) deployment. As will be described below, the exemplary embodiments include techniques related to physical downlink control channel (PDCCH) candidate mapping and PDCCH transmission for multi-TRP operation.

The exemplary embodiments are described with regard to a user equipment (UE). However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The exemplary embodiments are also described with regard to a 5G new radio (NR) network. However, reference to a 5G NR network is merely provided for illustrative purposes. The exemplary embodiments may be utilized with any network that is configured with multi-TRP capability. Therefore, the 5G NR network as described herein may represent any type of network that is configured with multi-TRP capability.

The 5G NR network may deploy a next generation node B (gNB) that is configured with multiple TRPs. Throughout this description, a TRP generally refers to a set of components configured to transmit and/or receive signals. In some embodiments, multiple TRPs may be deployed locally at the gNB. For example, the gNB may include multiple antenna arrays/panels that are each configured to generate a different beam. In other embodiments, multiple TRPs may be deployed at various different locations and connected to the gNB via a backhaul connection. For example, multiple small cells may be deployed at different locations and connected to the gNB. However, these examples are merely provided for illustrative purposes. Those skilled in the art will understand that TRPs are configured to be adaptable to a wide variety of different conditions and deployment scenarios. Thus, any reference to a TRP being a particular network component or multiple TRPs being deployed in a particular arrangement is merely provided for illustrative purposes.

The TRPs described herein may represent any type of network component configured to transmit and/or receive a signal.

In a multi-TRP deployment scenario, a PDCCH may include downlink control information (DCI) repetition over different TRPs. For example, a control resource set (CORESET) may be shared by two TRPs with different transmission configuration indicator (TCI) states. In one example configuration, one PDCCH candidate in a given search space (SS) set may be associated with both TCI states of the CORESET. In another example configuration, two sets of PDCCH candidates in a given SS set may be associated with the two TCI states of the CORESET, respectively. In a third example configuration, two sets of PDCCH candidates may be associated with two corresponding SS sets, where both SS states are associated with the CORESET and each SS set is associated with only one TCI of the CORESET. Those skilled in the art will understand that a set of PDCCH candidates may contain one or more PDCCH candidates and a PDCCH candidate in a set corresponds to a repetition. However, to adequately implement this type of functionality, there exists a need for mechanisms configured to perform PDCCH candidate mapping and PDCCH transmission for multi-TRP operation. Specific examples of exemplary PDCCH candidate mapping and PDCCH transmission techniques for a multi-TRP deployment scenario will be described in more detail below.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g. 5G cloud RAN, a next generation RAN (NG-RAN), a long term evolution RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the NR RAN 120.

The 5G NR RAN 120 may be a portion of a cellular network that may be deployed by a network carrier (e.g., Verizon, AT&T, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

In network arrangement 100, the 5G NR RAN 120 includes a cell 120A that represents a gNB that is configured with multiple TRPs. Each TRP may represent one or more components configured to transmit and/or receive a signal. In some embodiments, multiple TRPs may be deployed locally at the cell 120A. In other embodiments, multiple TRPs may be distributed at different locations and connected to the gNB.

Figure 2:
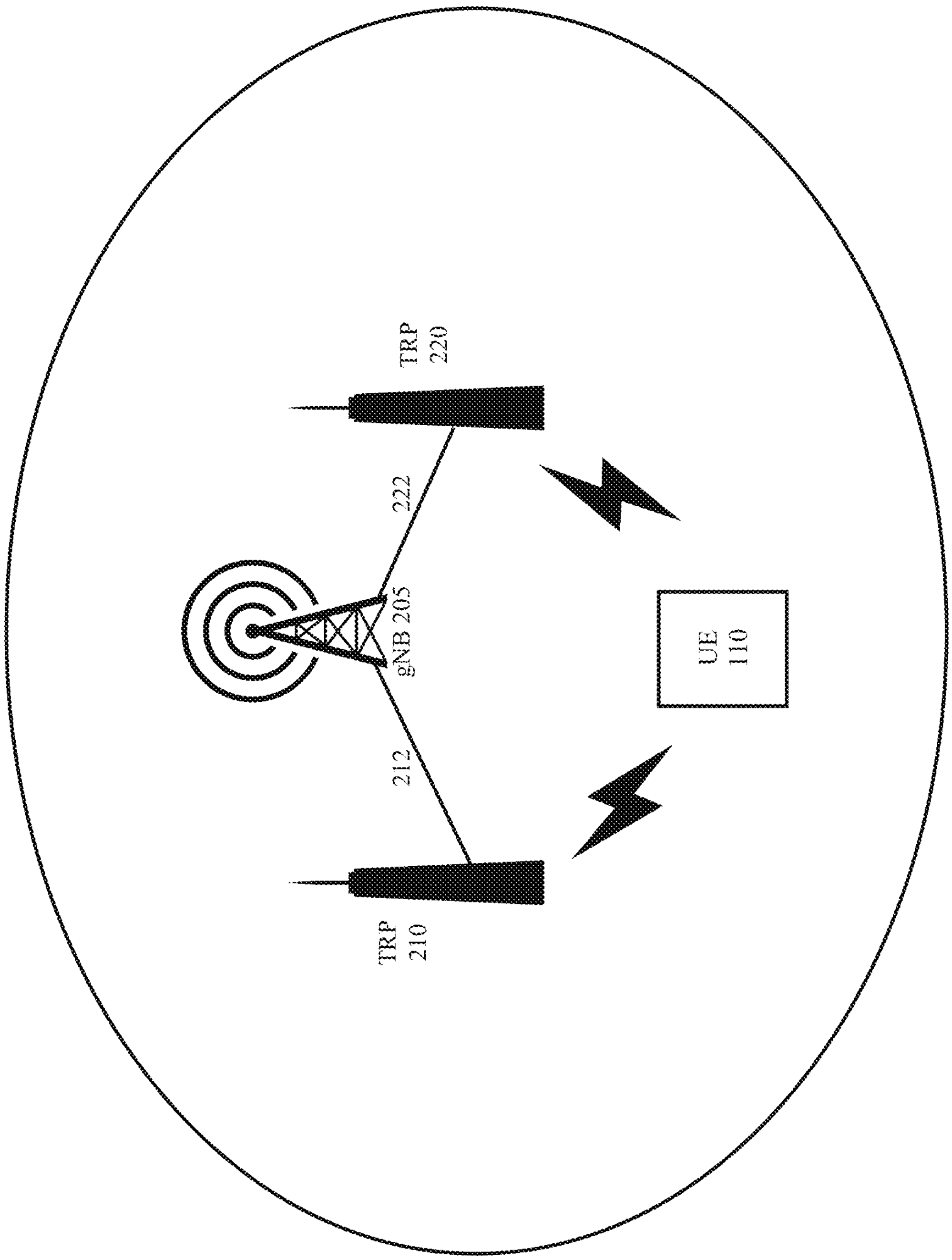
FIG. 2 shows an example of multiple transmission reception points (TRPs) deployed at different locations according to various exemplary embodiments.

FIG. 2 shows an example of multiple TRPs deployed at different locations. In this example, the gNB 205 is configured with a first TRP 210 via a backhaul connection 212 and a second TRP 220 via backhaul connection 222. Each of the TRPs 210, 220 may transmit a signal to and/or receive a signal from the UE 110. However, the gNB 205 may be configured to control the TRPs 210, 220 and perform operations such as, but not limited to, assigning resources, PDCCH candidate resource mapping, interleaving, etc.

The example shown in FIG. 2 is not intended to limit the exemplary embodiments in any way. Those skilled in the art will understand that 5G NR TRPs are adaptable to a wide variety of different conditions and deployment scenarios. An actual network arrangement may include any number of different types of cells and/or TRPs being deployed by any number of RANs in any appropriate arrangement. Thus, the example of a single cell 120A in FIG. 1 and a single gNB 205 with two TRPs 210, 220 in FIG. 2 is merely provided for illustrative purposes.

Returning to the network arrangement 100 of FIG. 1, the cell 120A may include one or more communication interfaces to exchange data and/or information with UEs, the corresponding RAN, the cellular core network 130, the internet 140, etc. Further, the cell 120A may include a processor configured to perform various operations. For example, the processor of the cell 120A may be configured to perform operations related to PDCCH candidate mapping and PDCCH transmission. However, reference to a processor is merely for illustrative purposes. The operations of the cell 120A may also be represented as a separate incorporated component of the cell 120A or may be a modular component coupled to the cell 120A, e.g., an integrated circuit with or without firmware. For example, the integrated circuit may include input circuitry to receive signals and processing circuitry to process the signals and other information. In addition, in some examples, the functionality of the processor is split among two or more processors such as a baseband processor and an applications processor. The exemplary embodiments may be implemented in any of these or other configurations of a cell.

The UE 110 may connect to the 5G NR-RAN 120 via the cell 120A. Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific cell (e.g., the cell 120A). However, as mentioned above, reference to the 5G NR-RAN 120 is merely for illustrative purposes and any appropriate type of RAN may be used.

In addition to the 5G NR RAN 120, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

As mentioned above, the exemplary embodiments include techniques related to physical downlink control channel (PDCCH) candidate mapping and PDCCH transmission for multi-TRP operations. From a UE 110 perspective, implementing these exemplary techniques may provide a performance benefit to operations related to PDCCH monitoring and/or PDCCH reception because these exemplary techniques improve the reliability and robustness of the PDCCH channel in a multi-TRP deployment scenario.

Figure 3:
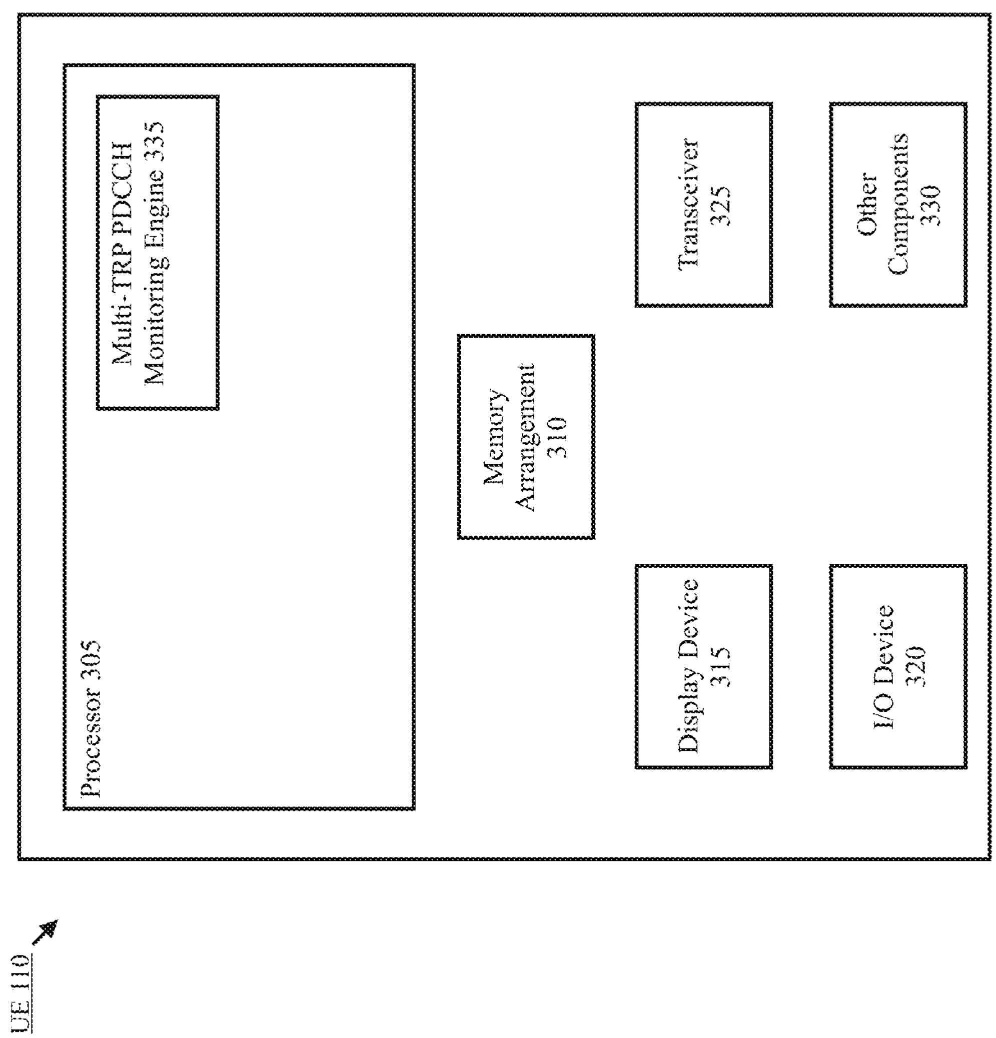
FIG. 3 shows an exemplary user equipment (UE) according to various exemplary embodiments.

FIG. 3 shows an exemplary UE 110 according to various exemplary embodiments. The UE 110 will be described with regard to the network arrangement 100 of FIG. 1. The UE 110 may include a processor 305, a memory arrangement 310, a display device 315, an input/output (I/O) device 320, a transceiver 325 and other components 330. The other components 330 may include, for example, an audio input device, an audio output device, a power supply, a data acquisition device, ports to electrically connect the UE 110 to other electronic devices, etc.

The processor 305 may be configured to execute a plurality of engines of the UE 110. For example, the engines may include a multi-TRP PDCCH monitoring engine 335. The multi-TRP PDCCH monitoring engine 335 may be configured to perform operations related to PDCCH monitoring and reception in a multi-TRP deployment scenario. For example, the multi-TRP PDCCH monitoring engine 335 may monitor the PDCCH for a CORESET shared by multiple TRPs.

The above referenced engine being an application (e.g., a program) executed by the processor 305 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 305 is split among two or more processors such as a baseband processor and an applications processor. The exemplary embodiments may be implemented in any of these or other configurations of a UE.

The memory arrangement 310 may be a hardware component configured to store data related to operations performed by the UE 110. The display device 315 may be a hardware component configured to show data to a user while the I/O device 320 may be a hardware component that enables the user to enter inputs. The display device 315 and the I/O device 320 may be separate components or integrated together such as a touchscreen. The transceiver 325 may be a hardware component configured to establish a connection with the 5G NR-RAN 120, an LTE-RAN (not pictured), a legacy RAN (not pictured), a WLAN (not pictured), etc. Accordingly, the transceiver 325 may operate on a variety of different frequencies or channels (e.g., set of consecutive frequencies).

As mentioned above, the exemplary embodiments relate to the PDCCH. The PDCCH may include a CORESET which refers to a set of time and frequency resources used to carry DCI. The resource elements (REs) of the CORESET may be characterized in RE groups (REGs) and REG bundles. Each REG may include multiple REs (e.g., 2, 6, 12, etc.) in one orthogonal frequency division multiplexing (OFDM) symbol and each REG bundle may include multiple REGs.

The PDCH may be carried by a particular number of control channel elements (CCEs). For example, the PDCCH may be carried by 1, 2, 4, 8, 16 or any other appropriate number of CCEs. Each CCE may include multiple REGs (e.g., 6 or any other appropriate amount). For PDCCH transmission, CCE-to-REG mapping may be performed. An example of CCE-to-REG mapping for multi-TRP PDCCH transmission will be provided in detail below.

On the UE 110 side, PDCCH reception may include monitoring PDCCH candidates. In some embodiments, this may include blindly decoding multiple PDCCH candidates in a search space. PDCCH monitoring and reception of CORESETs may require the UE 110 to take on a certain complexity and energy cost in exchange for scheduling flexibility and lower overhead on the network side. The exemplary techniques described herein improve both UE and network performance because these exemplary techniques improve the reliability and robustness of the PDCCH channel in a multi-TRP deployment scenario.

Figure 4:
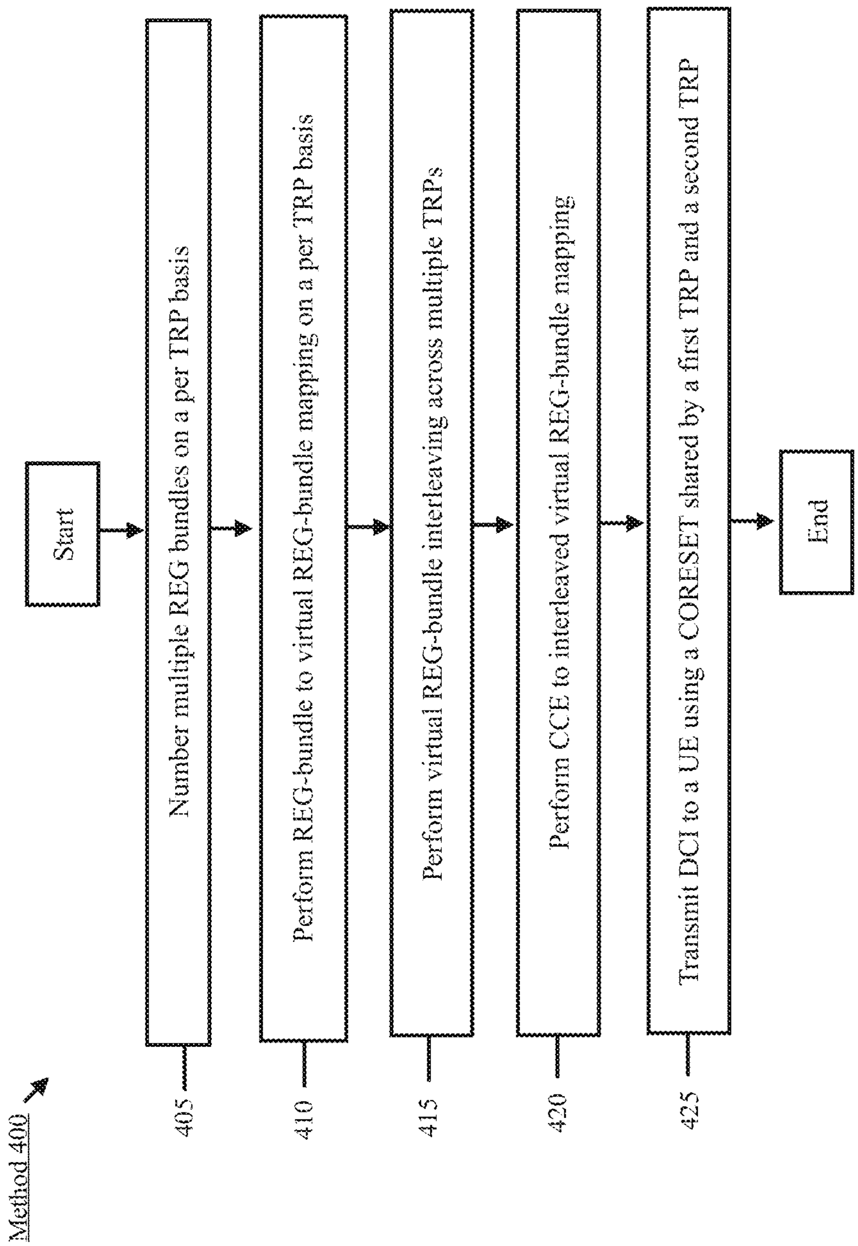
FIG. 4 shows a method for Multi-TRP physical downlink control channel (PDCCH) transmission according to various exemplary embodiments.

FIG. 4 shows a method 400 for Multi-TRP PDCCH transmission according to various exemplary embodiments. The method 400 will be described from the perspective of the cell 120A of the network arrangement 100.

A CORESET may be shared by multiple TRPs with different TCI states. The CCE-to-REG mapping for the shared CORESET may be interleaved or non-interleaved in units of REG bundles. The method 400 will describe different exemplary techniques for CCE-to-REG mapping for a CORESET shared by multiple TRPs. As will be described in more detail below, the exemplary techniques may achieve REG bundle interleaving across multiple TRPs and accordingly, improve PDCCH performance by leveraging the spatial diversity benefit.

In 405, the cell 120A may number multiple REG bundles on a per TRP basis. In this example, the REG-bundle defined in Rel-15 is reused and indexed on a per TRP basis. However, the exemplary embodiments are not limited to the REG-bundle defined in Rel-15 and may be applicable to any appropriate type of REG-bundle.

The numbering of the REG bundle per TRP may be represented as $REGB_{(i)}^{m}$ which may be defined as {iL, iL+1, . . . , iL+L−1} where L is the REG bundle size, m is the TRP index, i is defined as $\{0, 1, \ldots, N_{REGB}^{CORESET}-1\}$, $N_{REGB}^{CORESET}=N_{REG}^{CORESET}/L$, and $N_{REG}^{CORESET}=N_{RB}^{CORESET}N_{symb}^{CORESET}$ which represents the number of CORESETs in the shared CORESET of the TRP.

In 410, the cell 120A may perform REG-bundle to virtual REG-bundle mapping on a per TRP basis. This mapping may be represented by $V\_REGB_{(j)}^{m}$ which may be defined as $$\left\{f\left(\frac{6j}{L}\right), f\left(\frac{6j}{L}+1\right), \ldots, f\left(\frac{6j}{L}+\frac{6}{L}-1\right)\right\}$$

where f(.) is the interleaver defined in Rel-15 for CCE-to-REG mapping and j is the index of the virtual REG bundle.

Figure 5:
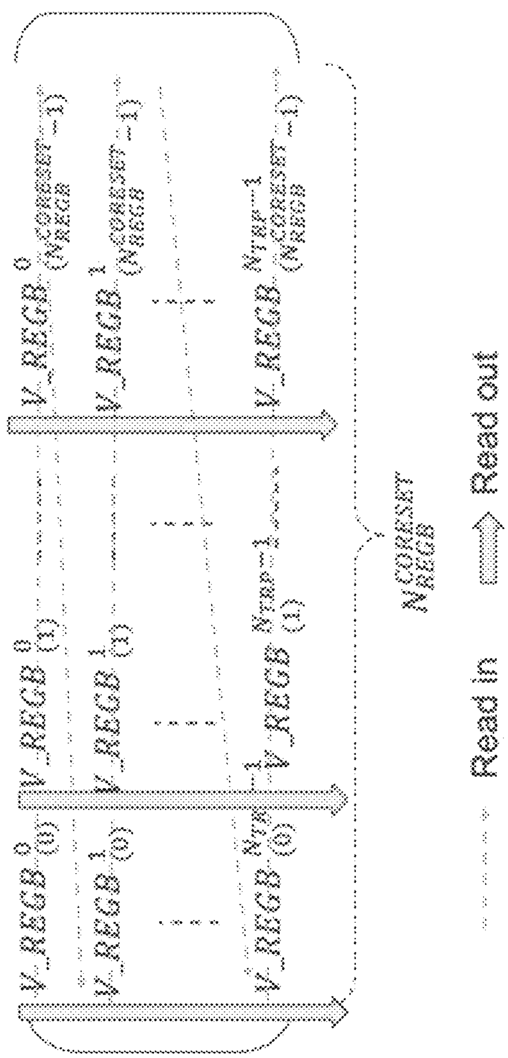
FIG. 5 illustrates an example of virtual resource element group (REG)-bundle interleaving across multiple TRPs according to various exemplary embodiments.

In 415, the cell 120A may perform virtual REG-bundle interleaving across multiple TRPs. As example of this is illustrated in FIG. 5.

The virtual REGs (V-REGs) input to the multi-TRP interleaver may be denoted by $V\_REGB_{(0)}{}^{m}$, $V\_REGB_{(1)}{}^{m}$, . . . , $V\_REGB_{(N_{REGB}{}^{CORESET}-1)}{}^{m}$. The output V-REG bundles from the multi-TRP interleaver may be derived as by assigning $C_{REGB}=N_{REGB}{}^{CORESET}$ be the number of columns of a matrix. The columns of the matrix may be numbered 0, 1, 2, . . . , $C_{REGB}-1$ from left to right. The number of rows of the matrix may then be based on $N_{TRP}$ which represents the number of TRPs sharing the CORESET.

Next, the V-REG bundle sequence ($V\_REGB_{(j)}{}^{m}$) may be written into the matrix ($C_{REGB}\times N_{TRP}$) row by row in an increasing order of V-REGB and TRP, starting from a first TRP (e.g., m=0).

The output of the V-REGB interleaver is the V-REGB sequence read out column by column from the matrix ($C_{REGB}\times N_{TRP}$) which is denoted by $V\_REGB_{(0)}{}^{I}$, $V\_REGB_{(1)}{}^{I}$, . . . , $V\_REGB_{(K_{\Pi}-1)}{}^{I}$ where $K_{\Pi}=N_{TRP}\times N_{REGB}{}^{CORESET}$.

In 420, the cell 120A may perform CCE to interleaved virtual REG-bundle mapping. In this example, CCE j consists of interleaved virtual REG bundles (CCE-to-V-REGB) represented as $\{V\_REGB_{(j)}{}^{I}, V\_REGB_{(j+1)}{}^{I}, \ldots, V_{REGB(j+5)}{}^{I}\}$.

In 425, the cell 120A performs a PDCCH transmission to the UE 110. For example, the cell 120A may transmit DCI to the the UE 110 using a CORESET shared by a first TRP and a second different TRP. The CORESET is based on the CCE-to-virtual-REG-bundle mapping described above. The UE 110 may receive the DCI carried by the PDCCH and perform a subsequent operation (e.g., transmission, reception, etc.) in response to the DCI. The example provided above was described with regard to a first TRP and a second TRP sharing a single CORESET. However, the exemplary embodiments are not limited to two TRPs sharing a single CORESET. Those skilled in the art will understand how the exemplary techniques described herein may be applied to more than two TRPs.

In some embodiments, a parameter $\Delta_{shift}{}^{TRP}$ may be introduced in 415-420 of the method 400 to shift REG bundles in different TRPs when constructing a CCE. The value of $\Delta_{shift}{}^{m}$ is a function of the TRP index m. In one example, $\Delta_{shift}{}^{m}=f(m)=m$. In another example, $\Delta_{shift}{}^{m}$ may be configured by higher layer signaling, e.g., through system information block (SIB) information or dedicated signaling.

Figure 6:
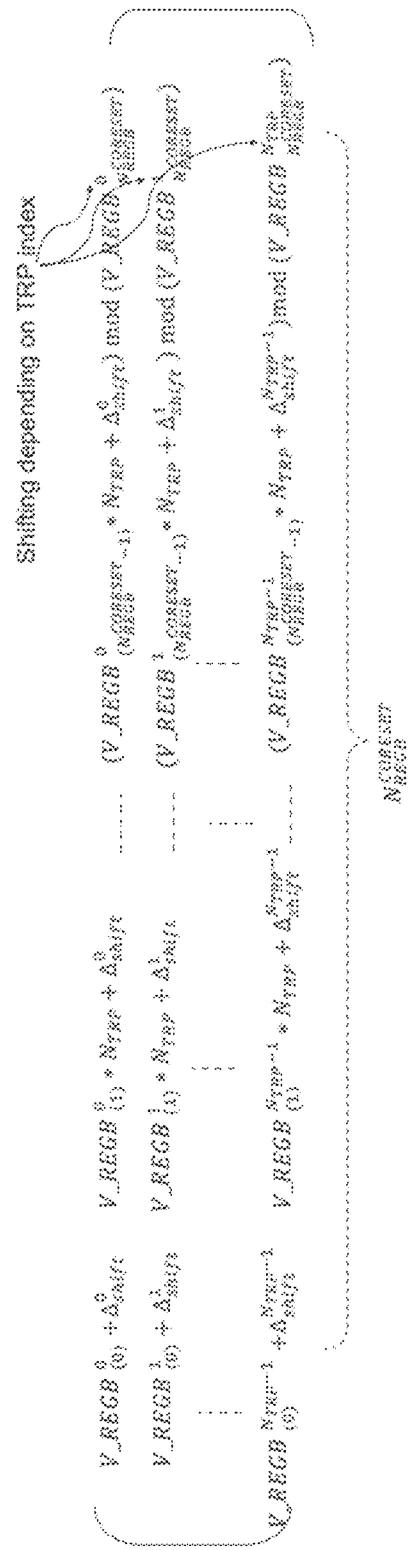
FIG. 6 illustrates an example of control channel element (CCE)-to-REG-bundle mapping with TRP-dependent REG-bundle shifting according to various exemplary embodiments.

FIG. 6 illustrates an example of CCE-to-REGB mapping with TRP-dependent REG-bundle shifting according to various exemplary embodiments. In this example, when ($V\_REGB_{(j)}{}^{m}$) is written into the matrix ($C_{REGB}\times N_{TRP}$) row by row in an increasing order of V-REGB and TRP, it starts from a first TRP for an even CCE index 2 and the order is switched to start from the second TRP for an odd CCE index 2K+1. This may ensure that all PDCCH resources across all of the TRPs are utilized.

In some embodiments, $\Delta_{shift}{}^{m}$ may be configured on a per CORESET basis and a single value is shared for all TRPs for the corresponding CORESET. In this example, interference coordination of PDCCH across multiple TRP clusters is possible by assigning different shift values for different clusters but a single value for multiple TRPs within a cluster.

The exemplary techniques described above with regard to FIGS. 4-6 may be extended to non-interleaved CCE-to-REG mapping by allowing REG bundle size to be configured with a smaller value than 6 (e.g., 2, 3, etc.).

Figure 7:
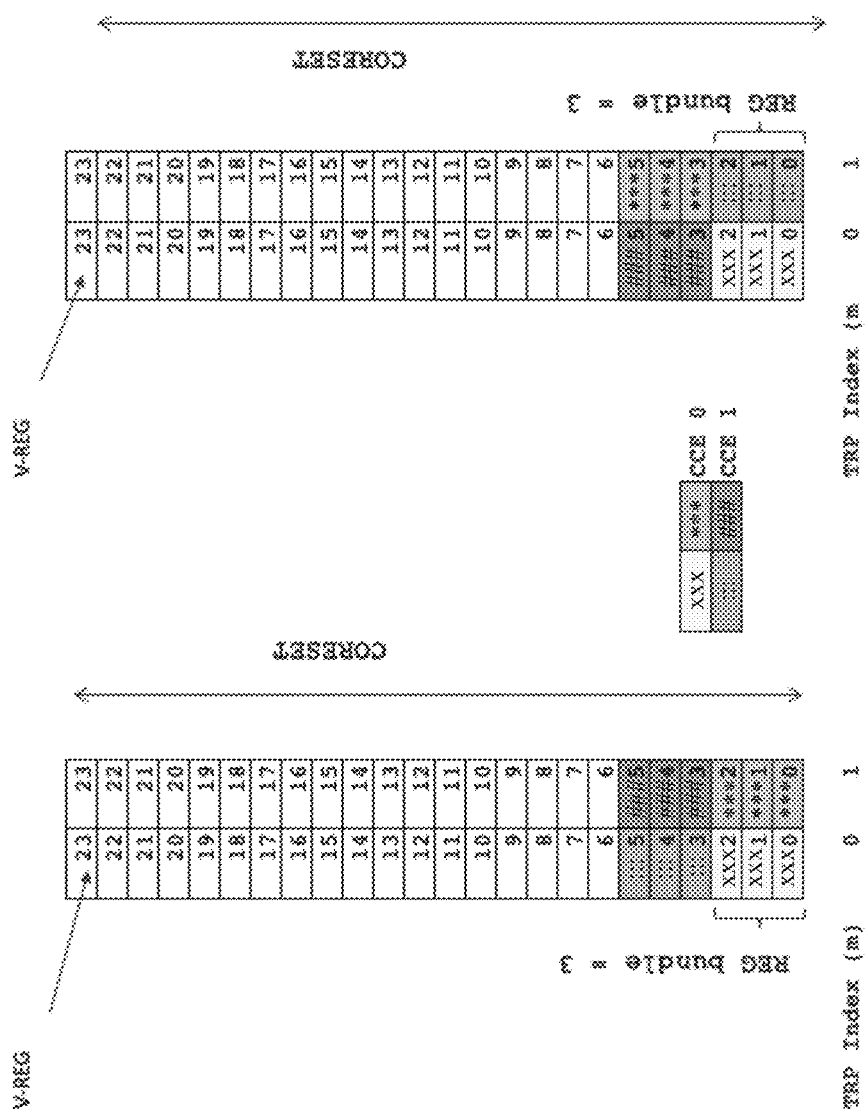
FIG. 7 shows an example of REG-bundle based CCE-to virtual-REG bundle mapping for PDCCH transmission for multiple TRP operation according to various exemplary embodiments.

FIG. 7 shows an example of REG-bundle based CCE to virtual-REG bundle mapping for PDCCH transmission on a shared CORESET for multiple TRP operation according to various exemplary embodiments. In this example, a CORESET duration is one OFDM symbol, the frequency domain resources include 24 physical resource blocks (PRBs), the REG bundle size is three and distributed CCE-to-REG mapping is performed.

Figure 8:
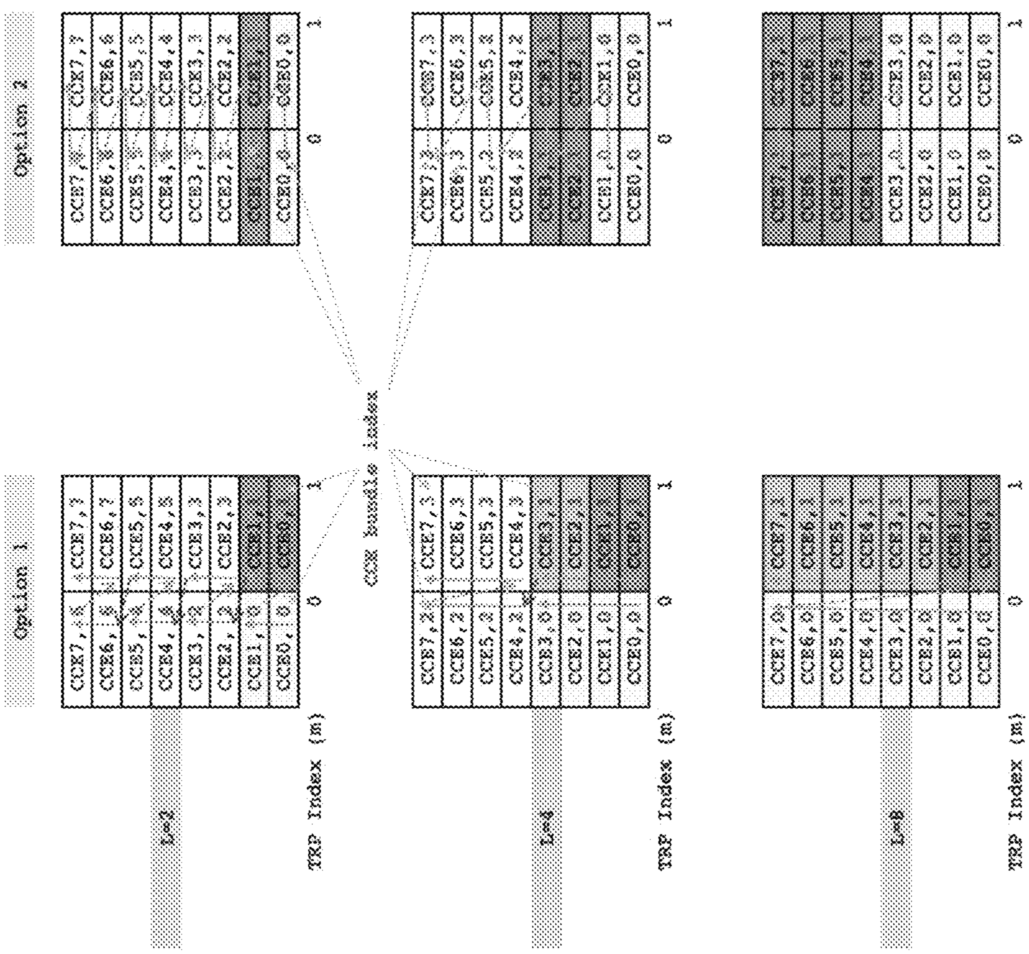
FIG. 8 illustrates an example of CCE bundles for different aggregation levels according to various exemplary embodiments.

Different approaches may be implemented to determine the CCEs across the TRPs. In some embodiments, a CCE-bundle is introduced for a PDCCH aggregation level L. FIG. 8 illustrates an example of CCE bundles for different aggregation levels according to various exemplary embodiments. FIG. 8 will be referenced below in the description of the different approaches that may be implemented to determine the CCEs across TRPs provided below.

One approach (e.g. option 1 of FIG. 8) may include a CCE-bundle within a CORESET of a single TRP. The CCE bundle k may be defined as CCE{k*L,k*L+1, . . . , k*L+L−1} of a single TRP, where L represents the applicable aggregation level. In FIG. 8, three examples are provided. In the first example L=2, in the second example L=4 and in the third example L=8. However, in actual deployment scenario L may equal 1, 2, 4, 8 or any other appropriate value. In addition, as shown in option 1 of FIG. 8, numbering of the CCE bundle index is done in increasing order of first TRP then frequency.

Another approach (e.g., option 2 of FIG. 8) may include a CCE-bundle across CCEs of different TRPs. The CCE bundle k may be defined as CCE pair {k,k+1, . . . , k+L/2} and each CCE pair k may include {CCEk in TRP #0,CCE k in TRP #1}. In addition, as shown in option 2 of FIG. 8, the numbering of the CCE bundle index is done in increasing order of frequency.

In some embodiments, different CORESETs may be configured with different CCE-bundle mapping based on different approaches (e.g., option 1 or 2 of FIG. 8) to allow dynamic switching between single TRP transmission and multiple TRP transmission for PDCCH by transmitting PDCCH on different CORESETs with different CCE-bundle mapping approaches.

For PDCCH monitoring, the set of PDCCH candidates to monitor may be defined in terms of CCE bundles. For example, the CCE bundles corresponding to PDCCH candidate m with aggregation level L may be represented by $$\left(\left(Y_{p,n^{\mu}_{s,f}} + \left\lfloor \frac{m_{s,n_{CI}} * N_{CCE,p}}{L * M^{(L)}_{s,max}} \right\rfloor + n_{CI}\right) \bmod \lfloor N_{CCE,p}/L \rfloor\right) m_{s,n_{CI}} = 0, \ldots, M^{(L)}_{s,n_{CI}} - 1$$

Here, the parameter $N_{CCE,p}$ may be defined as the number of CCEs in a CORESET across all the TRPs. To provide an example, in FIG. 8, $N_{CCE,p}=8\times 2=16$ and thus, 16 CCEs are shown in each example. $m_{s,n_{CI}}$ may represent the number of PDCCH candidates the UE 110 is configured to monitor for aggregation level L of a search space s. Similarly, like the REG-bundle based approach, one offset $\Delta_{shift}{}^{m}$ may be introduced as a function of TRP index to shift the CCE-bundle location to ensure the CCE-bundles are frequency division multiplexed (FDM) across multiple TRPs to facilitate UE 110 PDCCH reception. In some embodiments, $\Delta_{shift}{}^{m}$ may be represented in units of CCE bundles.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor configured to perform operations comprising:
- determining that a control resource set (CORESET) is to be shared by at least a first transmission reception point (TRP) and a second TRP corresponding to a cell of a network;
- performing resource element group (REG) bundle to virtual REG bundle mapping on a per TRP basis, wherein multiple REG bundles are indexed on the per TRP basis;
- performing virtual REG bundle interleaving across the first TRP and the second TRP by
  - determining a number of columns for a matrix based on, at least, a number of REG in the CORESET;
  - determining a number of rows for the matrix based on, at least, a number of TRPs sharing the CORESET;
  - inputting a first virtual REG bundle sequence into the matrix, and
  - generating a second virtual REG bundle sequence based on, at least, the matrix;
- performing control channel element (CCE) to interleaved REG bundle mapping; and
- transmitting downlink control information (DCI) using the CORESET, wherein the CORESET is configured based on, at least, the CCE to interleaved REG bundle mapping.

2. The processor of claim 1, wherein the first virtual REG bundle sequence is input into the matrix row by row in an increasing order of virtual REG bundle and TRP.

3. The processor of claim 1, wherein the operations further:
- determining whether an even CCE index or an odd CCE index is to be utilized;
- when the even CCE index is to be utilized, the first virtual REG bundle sequence is input into the matrix row by row in an increasing order of virtual REG bundle starting from the first TRP; and
- when the odd CCE index is to be utilized, the first virtual REG bundle sequence is input into the matrix row by row in an increasing order of virtual REG bundle starting from the second TRP.

4. The processor of claim 1, wherein the operations further comprise:
- shifting REG bundles in different TRPs when constructing a CCE based on a shifting parameter.

5. The processor of claim 4, wherein the shifting parameter is a function of a TRP index.

6. The processor of claim 4, wherein the shifting parameter is configured by higher layer signaling.

7. The processor of claim 4, wherein the shifting parameter is configured on a per CORESET basis.

8. A processor configured to perform operations comprising:
- monitoring a physical downlink control channel (PDCCH) for downlink control information (DCI) transmitted by a cell of a network;
  - wherein monitoring the PDCCH includes identifying a set of PDCCH candidates that is based on a control channel element (CCE) bundle,
  - wherein the PDCCH includes the CCE bundle within a control resource set (CORESET) and the CCE bundle corresponds to a single transmission reception point (TRP),
  - wherein the CCE bundle is based on, at least, the single TRP and an aggregation level;
- receiving the DCI carried by the PDCCH from the cell of the network; and
- performing an operation in response to the DCI.

9. The processor of claim 8, wherein the CCE bundle is indexed is based on, at least, a TRP index and frequency.

10. The processor of claim 8, wherein the PDCCH includes the CCE bundle across CCEs of multiple transmission reception points (TRPS).

11. The processor of claim 10, wherein the CCE bundle includes multiple CCE pairs, wherein each CCE pair includes a first CCE for a first TRP and a second CCE for a second TRP.

12. The processor of claim 10, wherein the CCE bundle is indexed in increasing order of frequency.

13. The processor of claim 8, wherein the PDCCH includes a first control resource set (CORESET) corresponding to a first transmission reception point (TRP) and a second CORESET that is shared by the first TRP and a second TRP.

14. A cell, comprising:
- a communication interface configured to communicate with a user equipment (UE); and
- a processor communicatively coupled to the communication interface and configured to perform operations comprising:
  - determining that a control resource set (CORESET) is to be shared by at least a first transmission reception point (TRP) and a second TRP of the cell;
  - performing resource element group (REG) bundle to virtual REG bundle mapping on a per TRP basis, wherein multiple REG bundles are indexed on the per TRP basis;

performing virtual REG bundle interleaving across the first TRP and the second TRP by determining a number of columns for a matrix based on, at least, a number of REG in the CORESET;

determining a number of rows for the matrix based on, at least, a number of TRPs sharing the CORESET;

inputting a first virtual REG bundle sequence into the matrix, and generating a second virtual REG bundle sequence based on, at least, the matrix;

performing control channel element (CCE) to interleaved REG bundle mapping; and transmitting downlink control information (DCI) using the CORESET, wherein the CORESET is configured based on, at least, the CCE to interleaved REG bundle mapping.

15. The cell of claim 14, further comprising:

shifting REG bundles in different TRPs when constructing a CCE based on a shifting parameter.

* * * * *